March 15, 1927.  F. J. TROLL  1,621,093
LOAD INDICATOR FOR MOTOR VEHICLES
Filed June 25, 1920   4 Sheets-Sheet 1
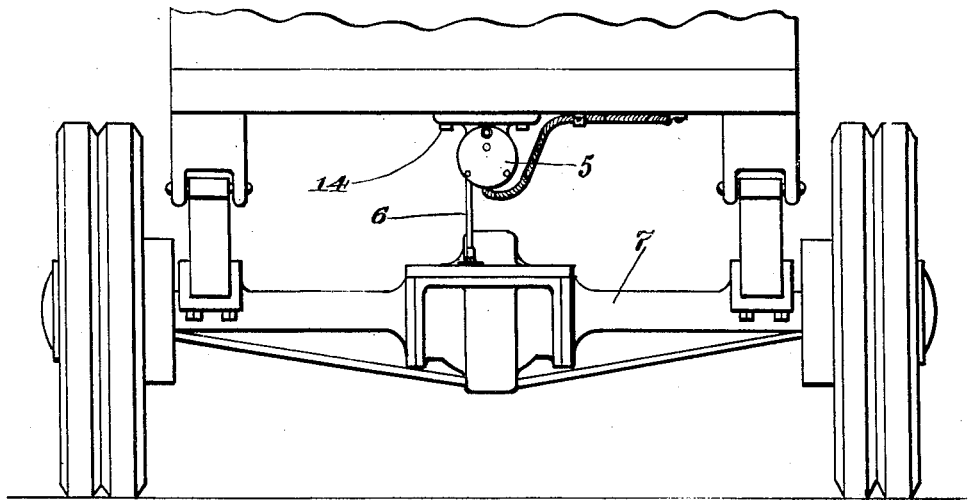
Fig. 1.
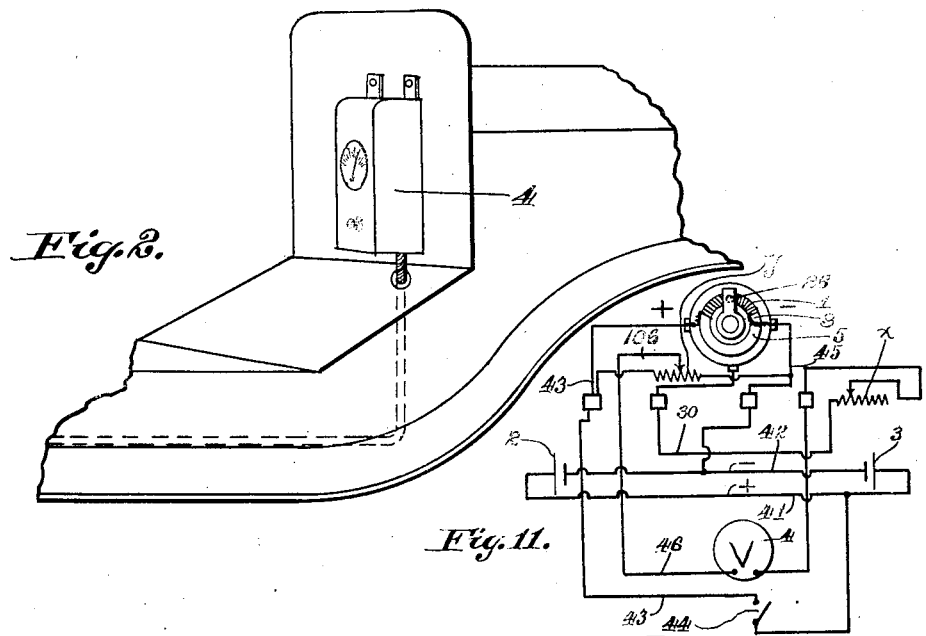
Fig. 2.
Fig. 11.

March 15, 1927.　　　　F. J. TROLL　　　　1,621,093
LOAD INDICATOR FOR MOTOR VEHICLES
Filed June 25, 1920　　　4 Sheets-Sheet 2

March 15, 1927.　　　F. J. TROLL　　　1,621,093
LOAD INDICATOR FOR MOTOR VEHICLES
Filed June 25, 1920　　　4 Sheets-Sheet 3
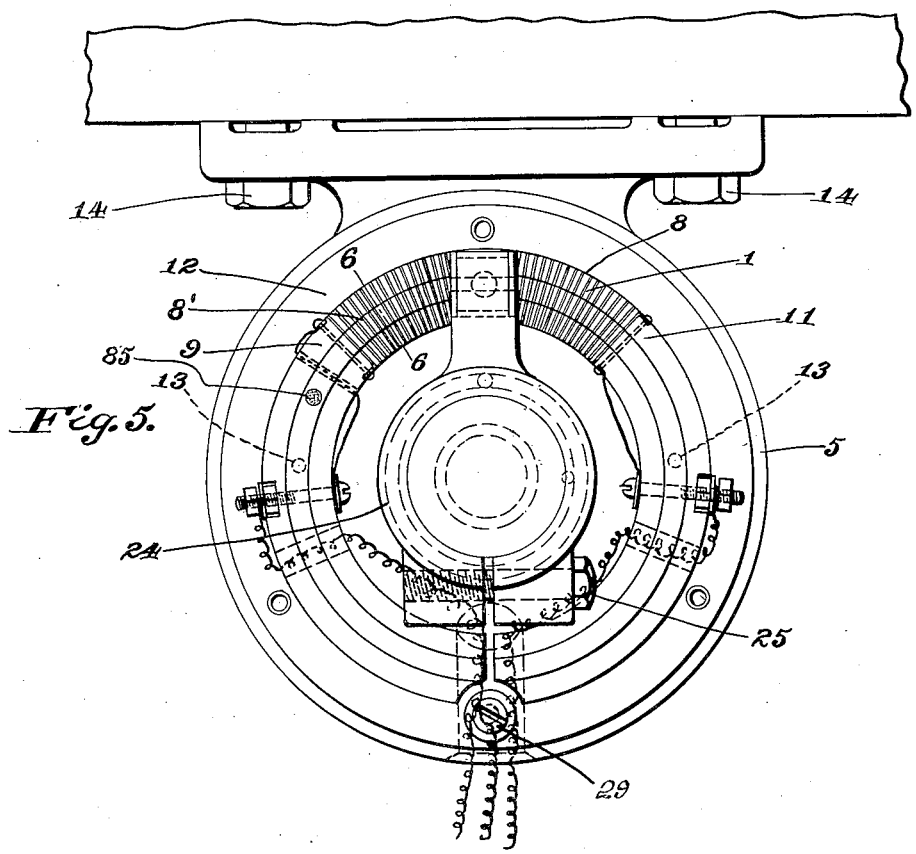
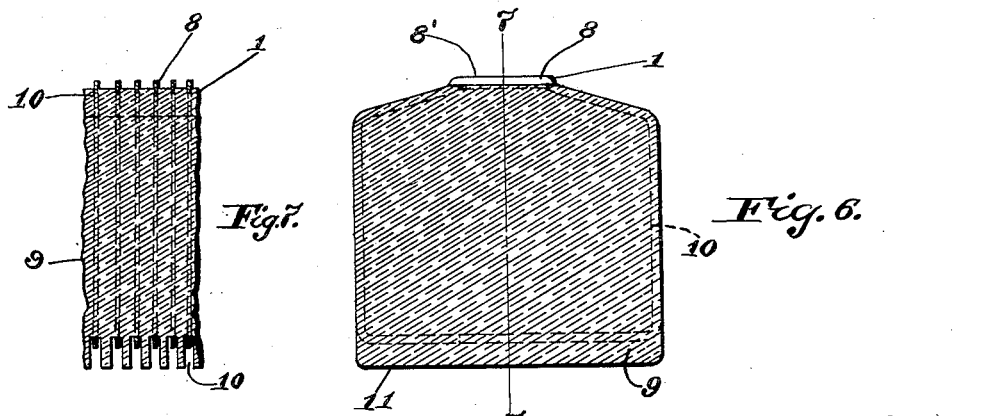
Witnesses.　　　　　　　　　　Inventor
　　　　　　　　　　　　　Frederick J. Troll.
　　　　　　　　　　　By
　　　　　　　　　　　　　　　　Attorney March 15, 1927.  
F. J. TROLL  
1,621,093  
LOAD INDICATOR FOR MOTOR VEHICLES  
Filed June 25, 1920  
4 Sheets-Sheet 4
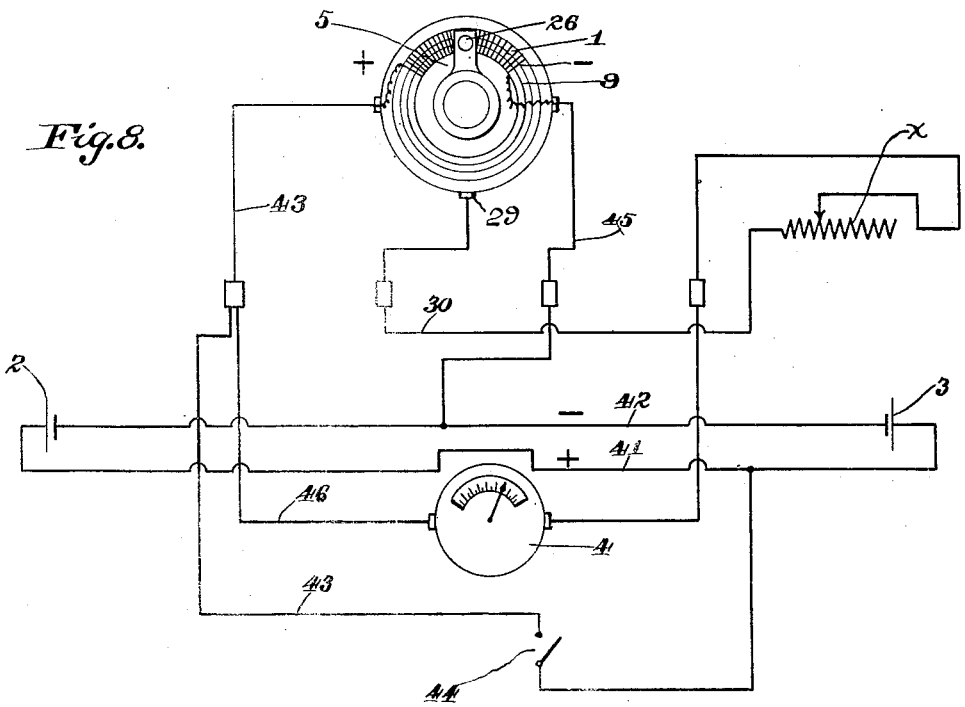
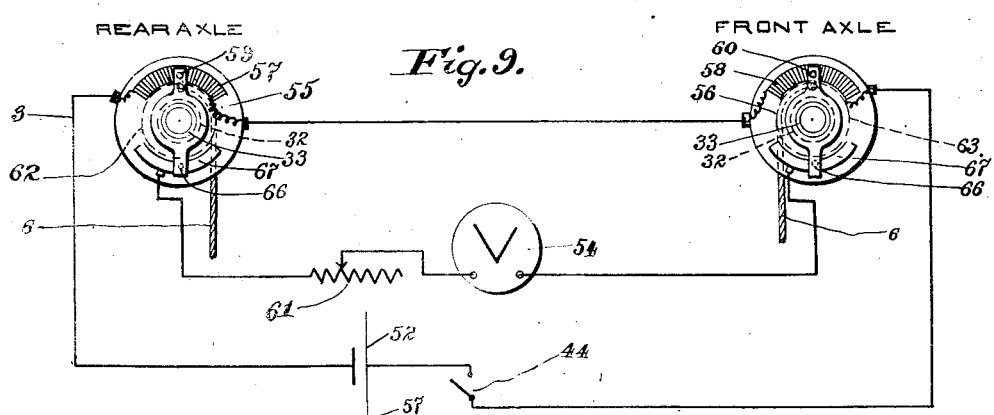

Patented Mar. 15, 1927.

1,621,093

UNITED STATES PATENT OFFICE.

FREDERICK J. TROLL, OF TOWSON, MARYLAND, ASSIGNOR TO THE LOADOMETER COMPANY, OF BALTIMORE COUNTY, MARYLAND, A CORPORATION OF DELAWARE.

LOAD INDICATOR FOR MOTOR VEHICLES.

Application filed June 25, 1920. Serial No. 391,753.

The present application relates to an improved weight-indicating device for trucks and other road vehicles, the original structure being disclosed and claimed in United States Patent No. 1,147,127, and re-issue of the same, No. 14,475.

The previous patent describes an electric, weight-indicating device for trucks, which includes a circuit, a source of current with an indicator, and a rheostat actuated by the variation of spring tension, for changing the resistance in the circuit, such changes being translated by the indicator into terms of the load.

The present application relates to an improved apparatus in which the indicating principle is dependent upon the line drop or difference of potential at different points in the circuit.

The device includes an extremely sensitive voltmeter, and the operation of the device depends upon the fact that the variation in tension of the springs supporting the load, resulting from the variation of load, serves to correspondingly change the point in the circuit to which the voltmeter is connected, causing the readings of the voltmeter, which is preferably graduated in terms of the load, to vary in correspondence with the variation of load.

The device may be connected to the rear axle only where it gives an approximately correct reading as to the load, or it may be connected to both the front and rear axles, the instrument thus giving a combined reading which corresponds directly to the total load.

In the accompanying drawing I have illustrated a load-indicating device, embodying my invention in the preferred form, in connection with a portion of the running gear and frame, or body, of the truck to which it is attached.

Figure 1 is an elevation of the rear axle of a truck, showing a portion of the frame, body and springs, with the apparatus of the invention attached.

Figure 2 is a perspective view of the dash and details of a truck, in the vicinity of the dash, showing the voltmeter, or potentiometer dial, in a convenient position.

Figure 5 is an elevation of the brush arm and coil, the covering being removed for convenience in illustration.

Figure 6 is a section through the coil on line 6—6 of Figure 5.

Figure 7 is a longitudinal section through the coil, the same being taken on the line 7—7 of Figure 6.

Figure 8 is a diagram of the circuit for a single apparatus attached to the rear axle only.

Figure 9 is a diagram of the apparatus for obtaining readings as to the weight, at the front and rear axle combined, to give the total load with exactness.

Figure 10 is a sectional view of the translating instrument of Figure 9.

Figure 11 is a circuit diagram showing another modification.

Figure 3:
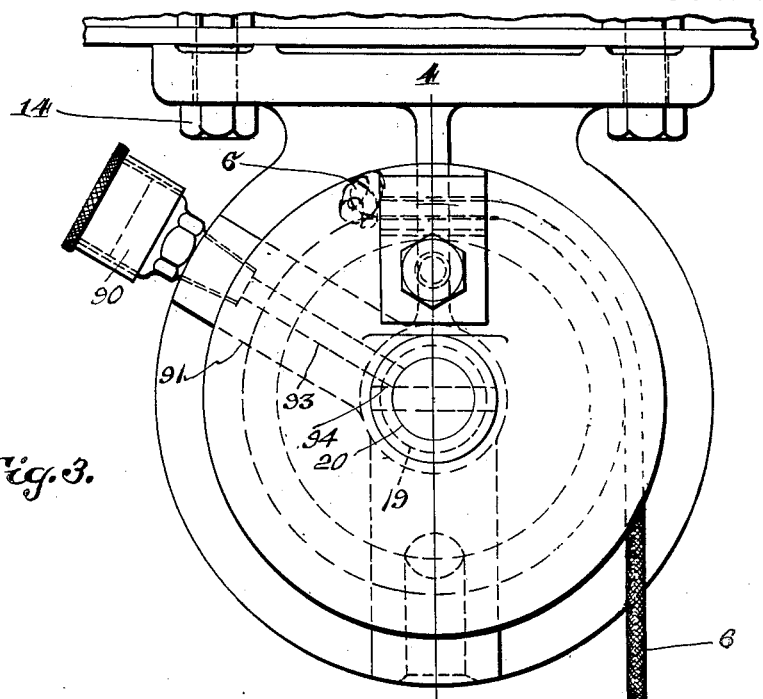
Figure 3 is an enlarged elevation of the translating device.

Referring to the drawings by numerals:

The improved form of apparatus includes a translating device by which the yielding of the springs or other mechanical change due to the load is applied to an electric circuit so this change and hence the load on the vehicle can be indicated by an electric instrument. It comprises a coil 1, which normally, or whenever weighing is to be undertaken, is in circuit with a suitable, preferably constant, source of electricity, shown in the form of batteries 2 and 3. The apparatus also includes a suitably calibrated voltmeter 4, which is in effect shunted around or in parallel to a variable portion of coil 1, the intermediate connection being made by means of a brush which is part of the translating device and which moves over the coil and changes the contact in correspondence with the variation of load, the coil being exposed for contact with the brush. The connection from the brush to the voltmeter may be direct, or both may be grounded in close proximity. Included in the voltmeter connection, or shunt, which is of very small conductive capacity, is an adjustable resistance X, used to compensate for fluctuation of the potential of the battery, and for variation of the spring tension, determining the capacity of the shunt.

In the form of the invention shown, in Figs. 1 and 8, the brush and coil forming the translating device—indicated in a general way by reference character 5—are mounted on the body, or frame, and the brush is actuated from the rear axle 7 by any suitable means, as cable 6.

More specifically, the translating device includes the coil 1, consisting of uninsulated, or partially un-insulated wire, preferably flat copper or similar wire, 8, wound upon a fibre ring 9, the surface of which is indented or cut, forming grooves 10, extending around the ring in a direction transverse to its length or circumference and parallel to its axis. The flat copper or similar wire 8 forming the coil is laid in the grooves and the grooves are discontinued in the centre of one axial end face, so that the wire is exposed in an arcuate path 8', corresponding to the path of the brush. The coil, in the form of the invention shown, occupies an arc on the ring of only about 45°. The grooves 10 are deepended at the rear face of the ring 11, to prevent short-circuiting where the ring is mounted on the base 12 of the translating device, to which it is secured by pins or screws 13 (see Fig. 5).

Figure 4:
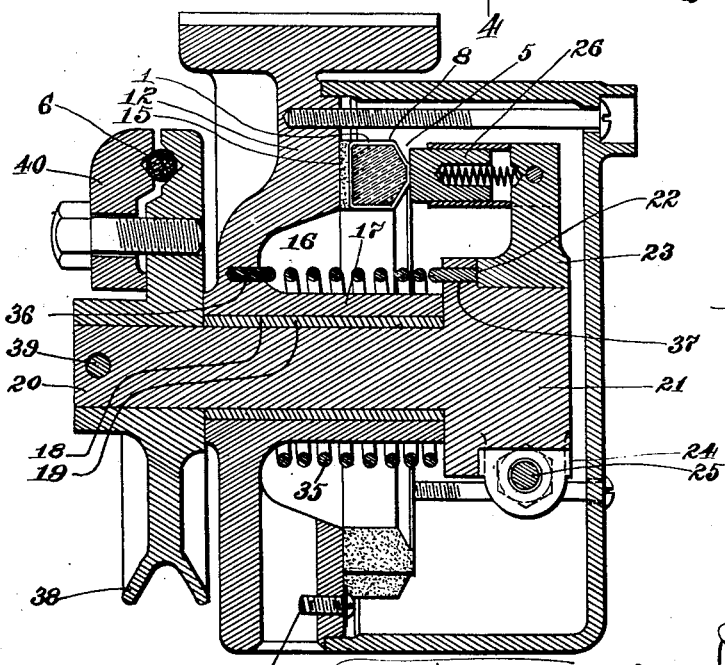
Figure 4 is a section through the same on the line 4—4 of Figure 3, the section being taken at right angles to the plane of Figure 3.

The base 12, Figs. 1 and 8, is secured beneath the frame and approximately over the rear axle, by means of bolts, or cap screws, 14, and the coil, or, more properly, the ring 9, on which the coil is wound, is placed on a circular seat 15, formed on the base for that purpose. As shown in Figure 4, the base is formed with an annular depression 16, within and enclosed by the seat 15; and centrally of this depression and concentric with the ring and seat is a boss 17, having a central opening 18, which, as shown, is lined with a sleeve 19, which serves as a bearing for shaft 20, having an enlarged head, or hub, 21, shouldered at 22 to receive a brush arm 23, which, as shown, includes a split collar 24, which encircles the hub and is secured by means of a set screw 25.

As shown, the brush arm carries a spring-actuated brush, or follower block, 26, to engage the coil, and the brush is grounded through the base 12, which has a binding screw 29 which is connected by wire 30 to the voltmeter 4 through the adjustable resistance X.

The position of the brush is controlled by means of a spring 35, which co-operates with the cable 6, serving to keep the cable under tension, the spring being, in the form of the invention shown, of the helical type, wound around the boss 17 and having one end inserted in a suitable aperture 36 in the base, and the other in a corresponding aperture 37 in the hub.

On the opposite end of the shaft 20 from the brush arms 24, I have shown a pulley 38, secured to the shaft by means of a pin 39, about which the cable 6 is wrapped; the end of the cable being secured to the pulley by means of a screw clamp 40. Pulleys of various sizes may be used to vary the gearing ratio to different size trucks, particularly for the purpose of obtaining the same length of pull on the cable 6, regardless of the differences of design, size of truck, springs, or distance between the instrument 5 and the axle 7.

In Figure 3 I have shown a grease cup 90, mounted on the end of an arm 91, projecting as shown, in a substantially radial direction from the boss 17. The arm has a passage 93 leading to the bearing surface of the shaft 20 and bushing 19, which latter is apertured at 94 in alignment with the passage 93. The arm is for the purpose of making the grease cup accessible.

The other end of the cable 6 may be secured to the axle 7 in any suitable manner. It is obvious that the arrangement might be inverted, the object of this portion of mechanism being merely to apply to the rheostat and translate thereby the change of relation between the body and axle due to the flexing of the springs into terms of the load on the vehicle.

Referring to the circuit diagram, Figure 8, relating to a single instrument mounted on the rear axle, I have shown a battery, consisting of two cells connected in parallel. These connections will be referred to as a positive bus 41 and a negative bus 42. The plus (+) end of the coil is connected to the positive bus 41 by wiring 43, including a push button 44, and the negative (—) end of the coil is connected to the negative bus by wiring 45. Leading from the wiring 43, at a point between the battery and the coil, is a low capacity conductor 46, connected to the voltmeter 4, from which the wire 30, including resistance X, leads to a suitable ground as represented by binding post 29, near or on the translator 5; or the voltmeter may be otherwise suitably connected across the translator to be actuated by change in line drop at the translator. In Figure 8 I have shown the voltmeter connection grounded beyond the resistance X at or immediately adjacent the brush 26, which is also grounded at 29.

In Figure 10 I have shown one translator of the two used in the two-translator, or front and rear axle system. This translator has two brushes—59 contacting the translator coil 57, and 66 engaging the contact arc 67. The brush arms are insulated by fibre washer 32 and sleeve 33.

In Figure 9 I have illustrated a system in which there is a brush and coil on both the front and rear axles, the two brushes being connected to the opposite terminals of the voltmeter. In this way a single combined reading is obtained for the front and rear axle, giving readings which are directly proportionate to the load, as distinguished from the apparatus, which is connected solely to the rear axle and gives readings which are in fact only proportionate to the weight on the rear axle, which bears a more or less constant relation to the entire load, and is sufficiently accurate for some purposes but not desirable in every instance.

In Figure 9 I have shown two translating elements, 55 and 56, secured to the front and to the rear axle, respectively; a battery 52 and a voltmeter 54. The two coils 57 and 58, of the units 55 and 56, are connected in series to the battery 52, and the respective brushes 59 and 60 are connected to the terminals of the voltmeter 54, which is in circuit with an adjustable resistance 61. As illustrated, the brush arms 62 and 63 are hung for opposite rotation, so that the readings of the front and rear axle are, in effect, added and the instrument is correspondingly calibrated. In this instance each brush is insulated instead of being grounded, and connected direct to the voltmeter, including a suitable resistance, the voltmeter connection forming a shunt around a varying portion of the two coils 57 and 58.

In operation, the button 44 is pressed, closing the circuit through the translator, whenever a reading as to the weight of the truck and load, or the load independently of the truck, depending on the calibration of the instrument, is desired. In this way the entire coil 1 is placed in circuit and maintained in circuit so long as the switch is closed at the button 44.

As already pointed out, the brushes and coils are mounted on the body or frame, and each brush is connected to an axle by means of the cable 6, which runs over the pulley 38, on the shaft 20, carrying the brush and arm, being secured at its upper end to the pulley.

As the distance between the axle and the truck body varies, due to variation of the tension of the springs, which, in turn, is due to variation of the load, the shaft 20 is rotated, moving the brush over the coil and changing the point of contact. As the voltmeter is connected to the plus end of the coil and grounded adjacent the brush, or connected to the brush, the reading is proportionate to the difference in voltage between these two points; and as the position of the brush, as aforesaid, varies in direct proportion to the load, the reading is likewise proportionate to the load. The variable resistance X, beyond the voltmeter, is for the purpose of calibrating or adjusting the voltmeter to compensate for variation of the tension or resistance of the springs, and also for variation of the battery strength. It is important to note that the current led through the voltmeter is negligible in electrical quantity, being merely for the purpose of measuring the difference in electrical pressure or voltage, the amperage being practically zero. In the apparatus shown in Figure 9 readings obtained at the front and rear axles are combined so that the instrument reads in terms of the entire load rather than in terms of the load on the rear axle.

In Figure 11 I have shown a slightly modified form, devised with the purpose of overcoming any difficulty which may be encountered due to a spring set or permanent deflection, which causes the brush 60 of the translator to take a no load position intermediate of the coil, which cannot give a no load reading of the indicator or voltmeter 4. This could be corrected by changing the position of the brush arm on the translator shaft, but the present device is intended to accomplish this without access to the translating device. For this purpose I have shown in Figure 11 a translator adjusting coil $y$, in parallel with the translator coil 1. This coil is so arranged that its capacity may be changed or adjusted, i. e., a portion of it may be cut out in any convenient manner as indicated, and, the adjustable contact point 106 is connected to the voltmeter and both ends of the coil are connected to the battery in parallel with the translator coil. This coil is most conveniently placed on the dash, with the switch representing the adjustable contact 106 so arranged that the capacity of coil $y$, or the portion of it in circuit, may be changed at the convenience of the operator to compensate for deflection of the springs, causing the indicator hand to stand at zero when the truck or vehicle equipped with the device is unloaded. Adjustable contact 106 can be used to correct the voltmeter readings in accordance with the spring set, and to compensate therefor because it serves to vary the potential applied to one terminal of the voltmeter to compensate for the variation of the potential applied to the other terminal due to the spring set.

I have thus described an apparatus embodying my invention specifically and in detail, in order that the nature and operation of the same may be clearly understood; however, the specific terms herein are used descriptively rather than in a limiting sense, the scope of the invention being defined in the claims.

What I claim and desire to secure by Letters Patent is:

1. In combination with a vehicle body or frame, front and rear axles and resilient means for supporting the body on said axles; a source of electricity; a circuit energized from said source of electricity; contacts at intervals in said circuit, arranged in a predetermined path; two brushes, each mounted to move over part of said contact points; means for actuating said brushes, comprising with the brushes a mechanical connection between the body and the front and rear axles respectively, the position of one being determined by the relation of the body or frame to the front axle, and the other by the relation of the body or frame to the rear axle; and a voltmeter connected through both of said brushes in parallel to a portion of the circuit the resistance of which portion is thus varied in proportion to the load, so that the instrument may be read in terms of the total load.

2. In combination with a vehicle body or frame, front and rear axles and resilient means for supporting the body on said axles; a source of electricity; a circuit energized from said source of electricity; contacts at intervals in said circuit, arranged in a predetermined path; two brushes, each mounted to move over part of said contact points; means for actuating said brushes comprising with the brushes a connection between each axle and the body, the position of one being determined by the relation of the body or frame to the front axle, and the other by the relation of the body or frame to the rear axle; and a voltmeter connected through both of said brushes, in parallel to a portion of the circuit, the resistance of which portion is thus varied in proportion to the load, so that the instrument may be read in terms of the total load, the voltmeter circuit being of extremely small capacity.

3. In an electric, load-indicating device for road vehicles, having an axle and a body and springs, a circuit-changing member, consisting of a coil having a series of contact points; a brush adapted to move over the contact points engaging them successively; a shaft carrying the brush; a pulley on the shaft; a spring tending to rotate the shaft in one direction; and a flexible tension member, operating, when placed under tension, to rotate the shaft in the opposite direction, said shaft pulley and tension member connecting the axle and the body of the vehicle, the tension on said member being determined by the relation between the axle and body of the vehicle.

4. In a load-indicating device for a road vehicle having an axle and a body, a circuit-changing member, consisting of an electric resistance having a series of contact points, forming a contact path; a brush co-operating with said points; a shaft on which the brush is mounted; an arm on said shaft; a spring tending to rotate the shaft to move the brush to one end of the path; and a flexible member connected to said shaft tending to rotate the shaft in opposition to the spring, said flexible member shaft and brush arm forming a connection between the axle and body.

Signed by me at Baltimore, Maryland, this 23rd day of June, 1920.

FREDERICK J. TROLL.